US008988211B2

(12) United States Patent
Masudaya et al.

(10) Patent No.: US 8,988,211 B2
(45) Date of Patent: Mar. 24, 2015

(54) VEHICLE INCLUDING SEAT BELT (71) Applicant: ALPS Electric Co., Ltd., Ota-ku, Tokyo (JP)

(72) Inventors: Hideki Masudaya, Tokyo (JP); Susumu Kanno, Tokyo (JP); Shinya Abe, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 82 days.

(21) Appl. No.: 13/896,493

(22) Filed: May 17, 2013

(65) Prior Publication Data
US 2013/0314223 A1 Nov. 28, 2013

(30) Foreign Application Priority Data
May 23, 2012 (JP) ................. 2012-117902

(51) Int. Cl.
B60Q 1/00 (2006.01)
B60R 22/48 (2006.01)
B60R 16/023 (2006.01)

(52) U.S. Cl.
CPC ......... B60R 22/48 (2013.01); *B60R 2022/4816* (2013.01); B60R 16/0232 (2013.01)
USPC ...................... 340/457.1; 340/10.1

(58) Field of Classification Search
CPC ... B60R 2022/4816; B60R 1/00; B60N 2/002
USPC ................. 340/457.1, 10.1, 426.16
See application file for complete search history.

(56) References Cited

U.S. PATENT DOCUMENTS

| 2004/0119599 | A1 | 6/2004 | Stevenson et al. |
| 2007/0096891 | A1 | 5/2007 | Sheriff et al. |
| 2007/0139173 | A1 | 6/2007 | Tang et al. |
| 2007/0221428 | A1* | 9/2007 | Strutz et al. ................. 180/268 |
| 2008/0238647 | A1 | 10/2008 | Abe |
| 2009/0160616 | A1 | 6/2009 | Messner et al. |

FOREIGN PATENT DOCUMENTS

| DE | 100 37 260 | 3/2002 |
| JP | 2008-238947 JP | 10/2008 |
| WO | 2009008949 | 1/2009 |

OTHER PUBLICATIONS

Extended European Search Report from corresponding European Application No. 13168523.2 mailed Aug. 8, 2013.

* cited by examiner

*Primary Examiner* — Shirley Lu
(74) *Attorney, Agent, or Firm* — Hunton & Williams LLP (57) ABSTRACT

A vehicle includes a vehicle side device having a vehicle side transmitting-receiving section performing wireless communicating with a seat belt side and a control section (determination section) determining an installation state, based on a signal from the seat belt side; and a seat belt side device having a seat belt side transmitting-receiving section performing wireless communicating with the vehicle side, a first switching unit of which switches the state according to detaching and installing of the seat belt and an output unit which outputs a detaching-installing signal to the seat belt side transmitting-receiving section in response to the state of the first switching unit. A power is fed to the seat belt side transmitting-receiving section and the output unit, and the signal is output and transmitted by the signal form the vehicle side transmitting-receiving section.

14 Claims, 9 Drawing Sheets

VEHICLE INCLUDING SEAT BELT

CLAIM OF PRIORITY

This application contains subject matter related to and claims benefit of Japanese Patent Application No. 2012-117902 filed on May 23, 2012, the entire contents of which is incorporated herein by reference.

BACKGROUND OF THE DISCLOSURE

1. Field of the Disclosure

The present disclosure relates to a vehicle including a seat belt which detects an installation state in a vehicle side by wireless communicating with the vehicle.

2. Description of the Related Art

In the related art, a technique has been known which displays an installation state of a seat belt by detecting the installation state thereof. In this case, the detection of the installation state is performed by a buckle switch provided inside a buckle device configuring the seat belt. Accordingly, when detecting that the installation state is performed, a signal is wirelessly transmitted from the seat belt to a control section of the vehicle and the control such as display is performed.

The vehicle including such a seat belt is, for example, disclosed in Japanese Unexamined Patent Application Publication No. 2008-238947. The vehicle includes a first transmitter of the seat belt side which wirelessly transmits a predetermined signal when an installation operation of the seat belt is detected, a second transmitter of the seat belt side which wirelessly transmits a predetermined signal when a preliminary operation is detected before the seat belt is installed, a receiver of the vehicle side which receives the signal from the first and second transmitters, and a control section of the vehicle side determines the installation state of the seat belt, based on the signal received from the receiver. The receiver of the vehicle side switches from an intermittent operation state to a continuous operation state by receiving the signal from the second transmitter and the control section determines that the seat belt is installed when the signal is received from the first transmitter, after the signal is received from the second transmitter. In addition, the wireless communication from the first and second transmitters is performed by a power fed from a power source such as a battery provided on the seat belt side.

In the vehicle including such a seat belt of the related art, the signal from the first transmitter requires a data signal for identifying the seat having the seat belt and the signal from the second transmitter requires a preamble signal in which the receiver of the vehicle side switches from an intermittent operation state to a continuous operation state. Furthermore, since the receiver of the vehicle side is necessary to receive the signal from the first transmitter, after the signal is received from the second receiver in order to determine whether the seat belt is installed, there is a problem that the wireless communication time between each of the transmitters and the receivers becomes long.

These and other drawbacks exist.

SUMMARY OF THE DISCLOSURE

The present disclosure provides a vehicle including a seat belt in which wireless communication time between the seat belt side and the vehicle side can be shortened.

A vehicle including a seat belt according to various embodiments, has a seat belt which is provided on a seat and a vehicle side device wireless communicating with the seat belt side and determining an installation state of the seat belt, wherein the seat belt includes a seat belt side transmitting-receiving section which transmits a detaching-installing signal indicating whether or not the seat belt is in the installation state to the vehicle side device when receiving a request signal transmitted from the vehicle side device, and an output unit which outputs the detaching-installing signal to the seat belt side transmitting-receiving section, and wherein the vehicle side device includes vehicle side transmitting-receiving section which transmits the request signal to the seat belt side transmitting-receiving section and receives the detaching-installing signal, and a control section which controls the vehicle side transmitting-receiving section so as to output the request signal and determines the installation state of the seat belt, based on the detaching-installing signal.

In a vehicle including a seat belt according to an embodiment of the disclosure, the seat belt side transmitting-receiving section may have a RF circuit section, the output unit may have a resonant circuit section connected to the RF circuit section and the resonant circuit section in which a grounded vibrator and a grounded signal changing unit are connected in parallel with each other and which may have a switching unit switching the connection state between the vibrator and the signal changing unit.

In a vehicle including a seat belt according to an exemplary embodiment, the signal changing unit may be configured of a first signal changing unit and a second signal changing unit which are connected in parallel with each other, the switching unit may be configured of a first switching unit which is connected in series with the first signal changing unit and a second switching unit which is connected in series with the second signal changing unit, and the first signal changing unit may be provided on the seat belt and the second signal changing unit is provided on the seat.

In a vehicle including a seat belt according to an exemplary embodiment, the first signal changing unit may be configured of any one of a capacitor and a resistance, and the second signal changing unit is configured of the other of the capacitor and the resistance.

In a vehicle including a seat belt according to an exemplary embodiment, the vehicle side device may include a trigger-operation detection section which detects a trigger operation corresponding to a timing when the installation state of the seat belt is determined, and the trigger-operation detection section may be connected to the control section and the control section instructs the vehicle side transmitting-receiving section to output the request signal when the signal is input from the trigger-operation detection section.

In a vehicle including a seat belt according to an exemplary embodiment, the vehicle side transmitting-receiving section is configured of a RFID reader•writer, and the seat belt side transmitting-receiving section and the output unit may be configured of a RFID tag, and the switching unit is connected to the RFID tag.

In a vehicle including a seat belt according to an exemplary embodiment of the invention, the switching unit may be configured of a detection switch provided inside a buckle section consisting of the seat belt.

According to a vehicle including a seat belt relating to the disclosure, the seat belt side transmitting-receiving section can transmit immediately the detaching-installing signal to the vehicle side device, when the request signal transmitted from the vehicle side device is received and the vehicle side device can determine the installation state of the seat belt, based on the detaching-installing signal. Accordingly, the vehicle including the seat belt can be provided in which the wireless communication time between the seat belt side and the vehicle side can be shortened. In addition, since the request signal can be output to the vehicle side device at any time, it is possible to determine the installation state of the seat belt at a necessary timing. Furthermore, the invention may be applied to a flip-up type seat.

According to a vehicle including a seat belt relating to the disclosure, the signal output from the output unit is changed by the switching of the switching unit. Accordingly, the installation state of the seat belt can be determined by the signal change in the control section. For example, when the capacitor is used as the signal changing unit, since the frequency of the signal output from the output unit is changed, the installation state of the seat belt can be determined by the change of the frequency in the control section. In addition, when the resistance is used as the signal changing unit, since the attenuation rate of the signal output from the output unit is changed, the installation state of the seat belt can be determined by the change of the attenuation rate in the control section. In addition, the installation state of the seat belt in each seat can be determined with a simple configuration by changing the capacitance value of the capacitor or the resistance value of the resistance for each seat, respectively, without applying the identification signal.

According to a vehicle including a seat belt relating to the disclosure, the signal which is changed by the switching state of the first switching unit is determined in the control section so that the installation state of the seat belt can be determined. In addition, the signal which is changed by switching state of the second switching unit is determined in the control section and the seated state of a person can be determined so that whether or not the person seated on the seat is restrained by the seat belt is reliably determined.

According to a vehicle including a seat belt relating to the disclosure, it is possible to determine reliably whether the person seated on the seat is restrained by the seat belt, based on the change of the frequency and the attenuation rate of the output signal from the output unit with a simple structure.

According to a vehicle including a seat belt relating to the disclosure, the installation state of the seat belt can be determined at the timing to determine the installation state of the seat belt.

According to a vehicle including a seat belt relating to the disclosure, the battery is not necessarily mounted on the seat belt side. Accordingly, the seat belt can be simplified with low cost.

According to a vehicle including a seat belt relating to the disclosure, the installation state of the seat belt can be determined with a simple structure.

DESCRIPTION OF THE PREFERRED EMBODIMENTS

The following description is intended to convey a thorough understanding of the embodiments described by providing a number of specific embodiments and details involving a vehicle including a seat belt. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
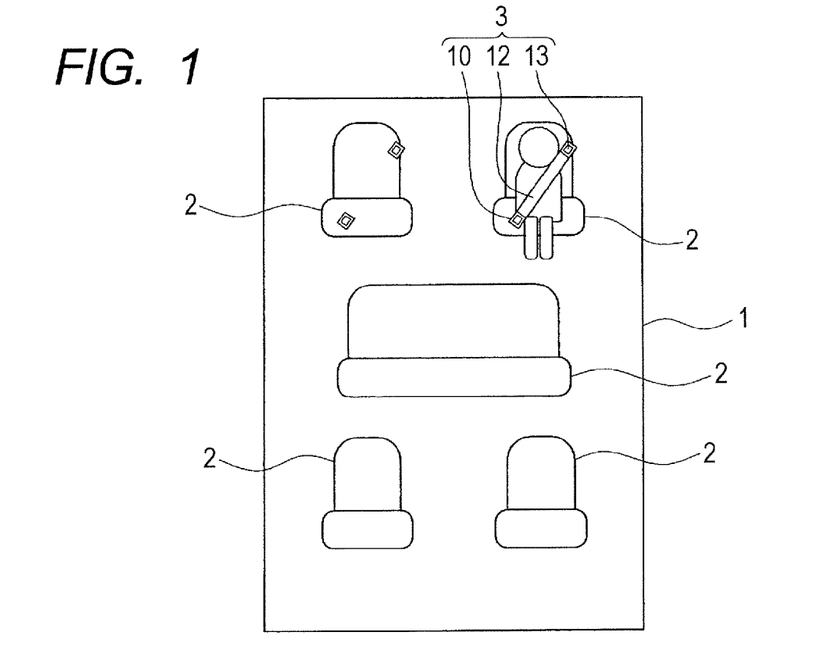
FIG. 1 is a schematic view of a vehicle according to an embodiment of the disclosure.

Various embodiments of the disclosure will be described in detail with reference to the drawings. FIG. 1 is a schematic view of a vehicle according to an exemplary embodiment. As illustrated in the view, a vehicle 1 illustrates, for example, a RV vehicle may include a plurality of seats 2 in a room. The seats 2 may be provided three rows in the room, the seats 2 of the last row may be detachably provided such as folding type, flip-up type and removing type, and a seat belt 3 may be provided on the seat 2. The seat belt 3 may be configured of a belt 12, a winding section 13 winding the belt 12, a tongue section 11 provided a front end of the belt 12, a buckle section 10 detaching and installing the tongue section 11 and a seat belt side device 40 performing wireless communication with a vehicle side device described below.

Figure 2:
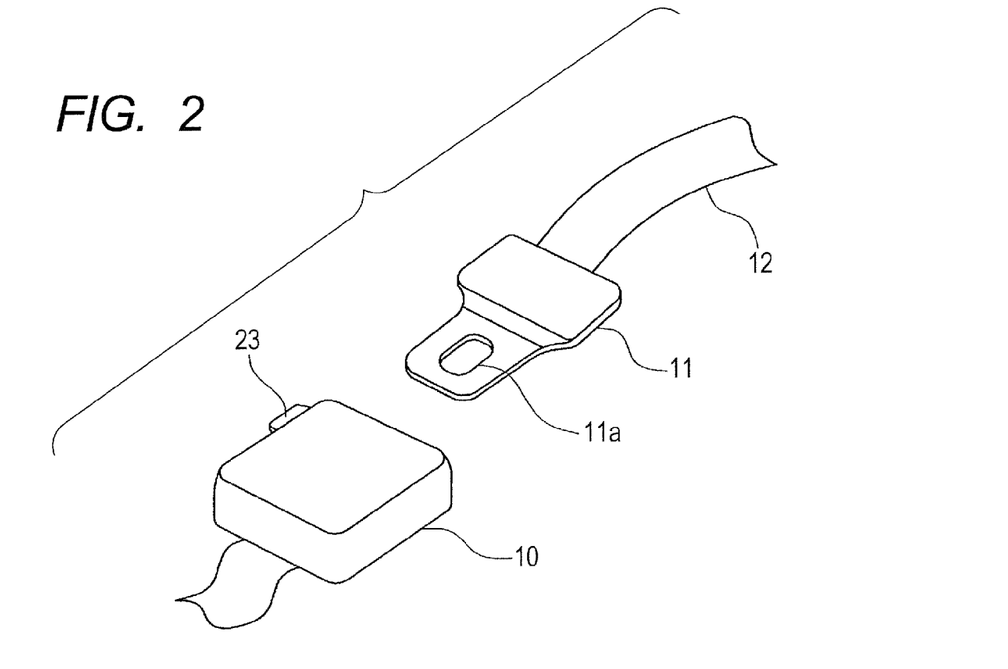
FIG. 2 is a perspective view illustrating a buckle section and a tongue section before a seat belt according to embodiments of the disclosure is installed.

The seat belt 3 provided on the seats 2 may be configured such that the belt 12 may be drawn from the winding section 13 provided on a shoulder of a person seated on the seats 2 toward the buckle section 10 provided in the vicinity of a waist of the person. The seat belt 3 may be configured such that the belt 12 may be drawn from the winding section 13 and the tongue section 11 may be inserted and fixed to the buckle section 10, when installing the seat belt 3. In addition, when releasing the installing of the seat belt 3, the tongue section 11 may be removed from the buckle section 10 and the belt 12 may be wound on the shoulder side. As illustrated in FIG. 2, the tongue section 11 may have an engaging section 11a which may engage with a front end of a hook member 24 described below.

Figure 3A:
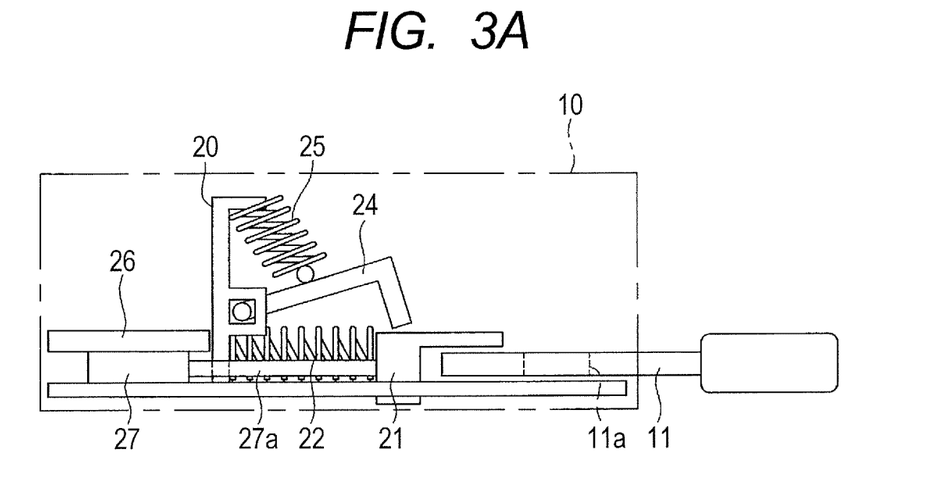
FIGS. 3A and 3B are schematic cross-sectional views before and after a seat belt according to embodiments of the disclosure is installed.
Figure 3B:
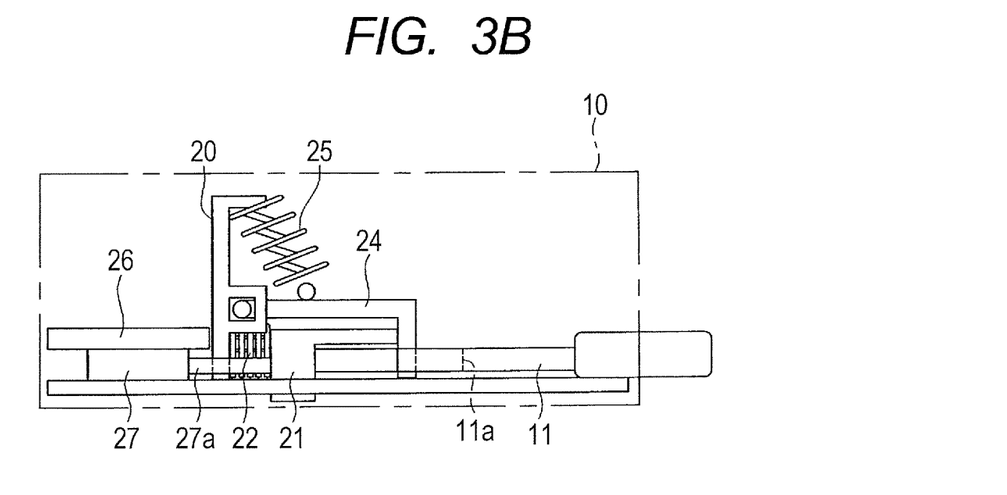

FIGS. 3A and 3B are schematic views illustrating states immediately before and after the tongue section 11 is installed on the buckle section 10. FIG. 3A illustrates a state immediately before the tongue section 11 is inserted into the buckle section 10 and FIG. 3B illustrates a state where the tongue section 11 is inserted and fixed to the buckle section 10.

The buckle section 10 may include a frame 20 configuring a body and a slider 21 capable of sliding to the frame 20 in an inserting direction of the tongue section 11. The slider 21 may be capable of sliding to the frame 20 via a first elastic member 22 and may be biased in a discharging direction of the tongue section 11 by the first elastic member 22. As illustrated in FIG. 3B, when the tongue section 11 is inserted into the buckle section 10, the slider 21 may slide in the inserting direction against the bias of the first elastic member 22.

The frame 20 may rotatably support the hook member 24. One end of the hook member 24 may be fixed to the frame 20 and the hook member 24 may be biased to a lower surface side of the frame 20 by a second biasing member 25.

As illustrated in FIG. 3A, a front end portion of the hook member 24 may abut an upper surface of the slider 21 and may be stopped against the biasing of the second biasing member 25 before the tongue section 11 is inserted. As illustrated in FIG. 3B, when the slider 21 slides in the inserting direction and the front end portion of the hook member 24 reaches to the hole-shaped engaging section 11a, the front end portion of the hook member 24 may be rotated and may be engaged with the engaging section 11a, and the tongue section 11 may be held inside the buckle section 10 by the second biasing member 25.

In a state where the tongue section 11 is held inside the buckle section 10, when a release button 23 illustrated in FIG. 2 is operated to push, the hook member 24 may be lifted up by a release mechanism (not illustrated), an engaging state to the tongue section 11 may be released, the slider 21 may slide in the discharging direction by a biasing force of the first elastic member 22, and then the tongue section 11 may be disposed outside the buckle section 10.

The frame 20 may have a base plate 26 on a rear side in the inserting direction of the tongue section 11. In the base plate 26, parts for the wireless communication described below may be disposed and a detection switch 27 forming a first switching unit as a switching unit which may detect the detaching-installing state of the tongue section 11. The detection switch 27 may include a detection section 27a sliding with the slider 21 and may have functions to switch connection states between a state when the tongue section 11 is not inserted and a state when the tongue section 11 is inserted, and to output signals different from each other. Detailed description of the detection switch 27 is given below. In addition, the detection switch 27 (the first switching unit) may be a switch device which may be turned on when the switch is pushed and turned off when the switch is released from the pushed state. In addition, the detection switch 27 may be configured of a non-contact type sensor consisting of an optical sensor or a magnetic sensor.

Figure 4:
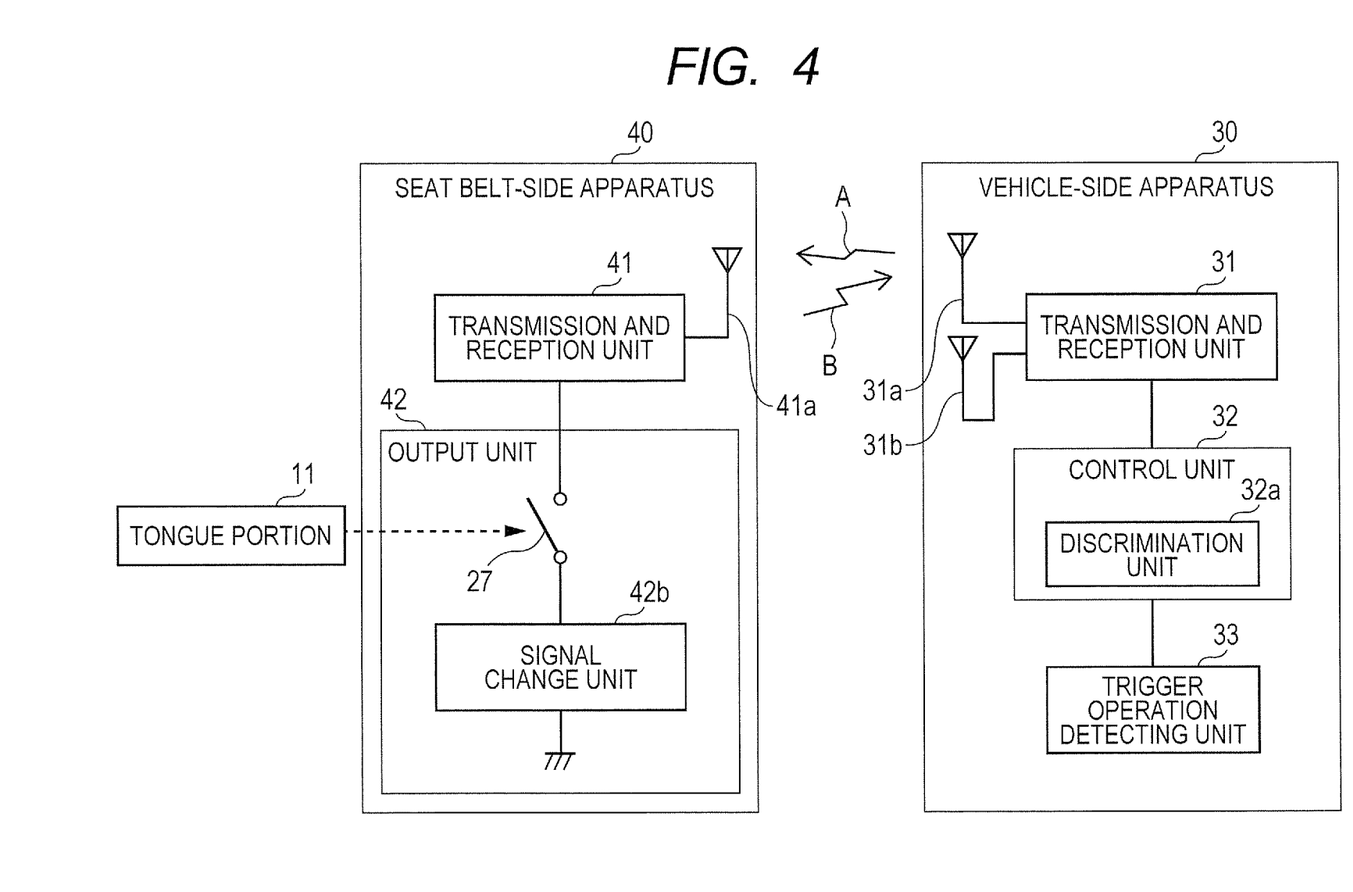
FIG. 4 is a block diagram of a vehicle side device and a seat belt side device to determine an installation state of the seat belt according to embodiments of the disclosure.

Next, configuration for determining the installation state of the seat belt 3, in other words, whether the seat belt 3 is installed so as to restrain a driver is described. FIG. 4 is a block diagram of a vehicle side device 30 and a seat belt side device 40 for determining the installation state of the seat belt 3. The vehicle side device 30 may be provided inside the vehicle 1 and the seat belt side device 40 may be provided on the seat 2 and then both sides may be wirelessly communicating with each other in both directions.

The vehicle side device 30 may have a vehicle side transmitting-receiving section 31 performing wireless communication with the seat belt side device 40 and a control section 32 including a determination section 32a determining the installation state of the seat belt 3, based on a detaching-installing signal (a signal B in FIG. 4) transmitted from the seat belt side device 40. The control section 32 may have a trigger-operation detection section 33 which may detect an operation corresponding to a timing to determine the installation state of the seat belt 3, that is, an operation of a trigger. In addition, the control section 32 may output a command signal which may instruct to output a request signal (a signal A in FIG. 4) described below with respect to the vehicle side transmitting-receiving section 31, when the trigger-operation detection section 33 detects the trigger operation.

The vehicle side transmitting-receiving section 31 may include a transmitting antenna 31a and a receiving antenna 31b. The transmitting antenna 31a may transmit a power feeding signal, which may be served as the request signal to request to transmit the detaching-installing signal (the signal B in FIG. 4) to the seat belt side device 40. The power feeding signal is for feeding the power to the seat belt side device 40. Meanwhile, the receiving antenna 31b may receive the detaching-installing signal transmitted from the seat belt side device 40. The vehicle side transmitting-receiving section 31 may get in an actuation state from a sleep state by a command signal from the control section 32 and can perform the transmitting and receiving of the signal. In addition, when a battery is mounted on the seat belt side device 40 side, since the power feeding signal is not necessary to be transmitted to the seat belt side device 40, the vehicle side transmitting-receiving section 31 may output only the request signal to the seat belt side device 40.

One trigger-operation detection section 33 is illustrated in FIG. 4; however, practically, a plurality of the trigger-operation detection sections may be provided inside the vehicle 1 according to various types of the trigger operation. The trigger operation may include, for example, an open-close operation of a door of the vehicle 1, a cranking operation, a starting operation of an engine, or the like. Accordingly, the request signal may be output to the vehicle side device at a necessary timing and can determine the installation state of the seat belt.

Figure 5:
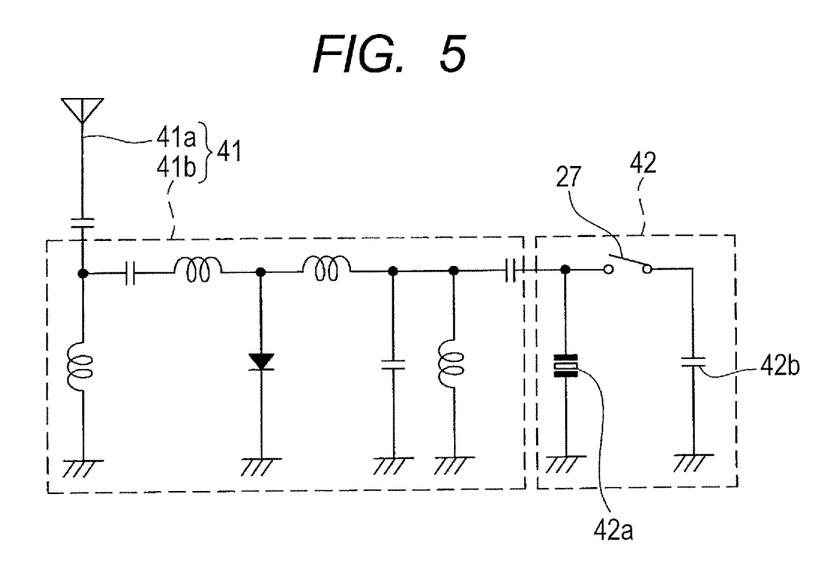
FIG. 5 is a circuit diagram illustrating a configuration of the seat belt side device according to embodiments of the disclosure.

The seat belt side device 40 may include a seat belt side transmitting-receiving section 41 performing the wireless communication with the vehicle side transmitting-receiving section 31 and an output unit 42 outputs the detaching-installing signal to the seat belt side transmitting-receiving section 41. As illustrated in FIG. 5, the output unit 42 may output the detaching-installing signal, based on whether or not the tongue section 11 is installed on the buckle section 10, that is, based on the ON and OFF of the detection switch 27. In addition, a vibrator 42a which may be grounded and the detection switch 27 connected to a signal changing unit 42b which may be grounded are connected in parallel with each other.

The seat belt side transmitting-receiving section 41 may include an antenna 41a and the power is supplied to each configuration element of the seat belt side device 40 by receiving the power feeding signal from the vehicle side device 30 in the antenna 41a. In addition, the detaching-installing signal output from the output unit 42 may be transmitted to the vehicle side device 30.

The vehicle side device 30 and the seat belt side device 40 of the embodiment operate generally as below. First when the trigger operation is detected, the power feeding signal may be transmitted from the vehicle side device 30. The seat belt side device 40 which receives the power feeding signal may be configured such that the output unit 42 may output the detaching-installing signal and may transmit the detaching-installing signal to the vehicle side device 30. At this time, since the detection switch 27 is ON state when the seat belt 3 is in the installation state, the output unit 42 may be connected to the signal changing unit 42b and outputs a signal illustrated in FIG. 6B as described below. In addition, since the output unit 42 is not connected to the signal changing unit 42b by the detection switch 27 when the seat belt 3 is in a non-installation state, the output unit 42 may output a signal illustrated in FIG. 6A as described below. As described above, since the output unit 42 can output the signal according to the connection state between the detection switch 27 and the signal changing unit 42b, the vehicle side device 30 can determine the detaching-installing signal of the seat belt 3 by detecting the difference between signal frequencies.

FIG. 5 is a circuit diagram illustrating a configuration of the seat belt side device 40 illustrated in FIG. 4. Since the power feeding signal serving as the request signal transmitted from the vehicle side device 30 may be a RF signal, the seat belt side transmitting-receiving section 41 may be configured of the antenna 41a and a RF circuit section 41b. The RF circuit section 41b may be a modem circuit section, for example, and may be connected in series with a resonant circuit section which may be the output unit 42. The resonant circuit section may be configured such that the vibrator 42a may be connected in parallel with the signal changing unit 42b which may be connected in series with the detection switch 27 and they are grounded. The signal changing unit 42b may be configured of a capacitor having a predetermined capacitance value.

Figure 6A:
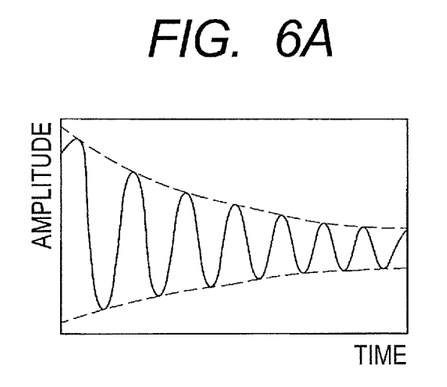
FIGS. 6A and 6B are waveform diagrams of a signal output from an output unit according to embodiments of the disclosure.
Figure 6B:
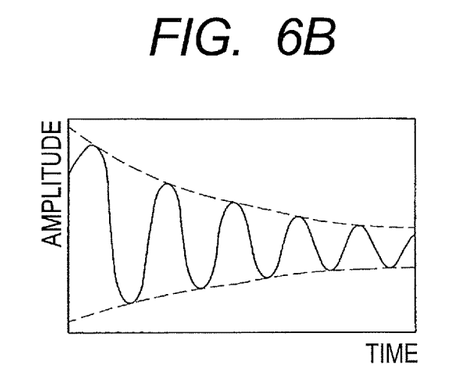

The power feeding signal received by the antenna 41a may be demodulated in the RF circuit section 41b and may become a signal of a predetermined frequency by the vibrator 42a of the output unit 42. FIGS. 6A and 6B are waveform views of a signal output from the output unit 42. FIG. 6A illustrates a state where the vibrator 42a is not connected to the signal changing unit 42b, in other words, illustrates a signal of the non-installation state of the seat belt 3.

When the vibrator 42a is not connected to the signal changing unit 42b, natural resonant frequency of the vibrator 42a may be a resonant frequency of the oscillation circuit directly and the signal of the frequency is output. The signal may be attenuated at a constant rate with the progress of time; however, the frequency is constant regardless of the progress of time.

FIG. 6B illustrates the signal of a state where the vibrator 42a is connected to the signal changing unit 42b, in other words, the signal of the installation state of the seat belt 3. As illustrated in the view, when the vibrator 42a is connected to the capacitor that is the signal changing unit 42b, since the resonant frequency of the oscillation circuit is changed, the frequency of the output signal may be different from FIG. 6A. However, the attenuation rate of the signal with the progress of time is the same as FIG. 6A.

As described above, the determination section 32a of the vehicle side device 30 can determine the state of the detection switch 27, in other words, the installation state of the seat belt 3 by detecting the frequency of the received detaching-installing signal. In addition, when each capacitor as the signal changing unit 42b having different capacitance value is provided for each seat, since the signal frequencies in FIGS. 6A and 6B are different from each other in the installation state of the seat belt 3, the installation state of the seat belt 3 on each seat can be easily determined by the frequency in the determination section 32a.

Figure 7:
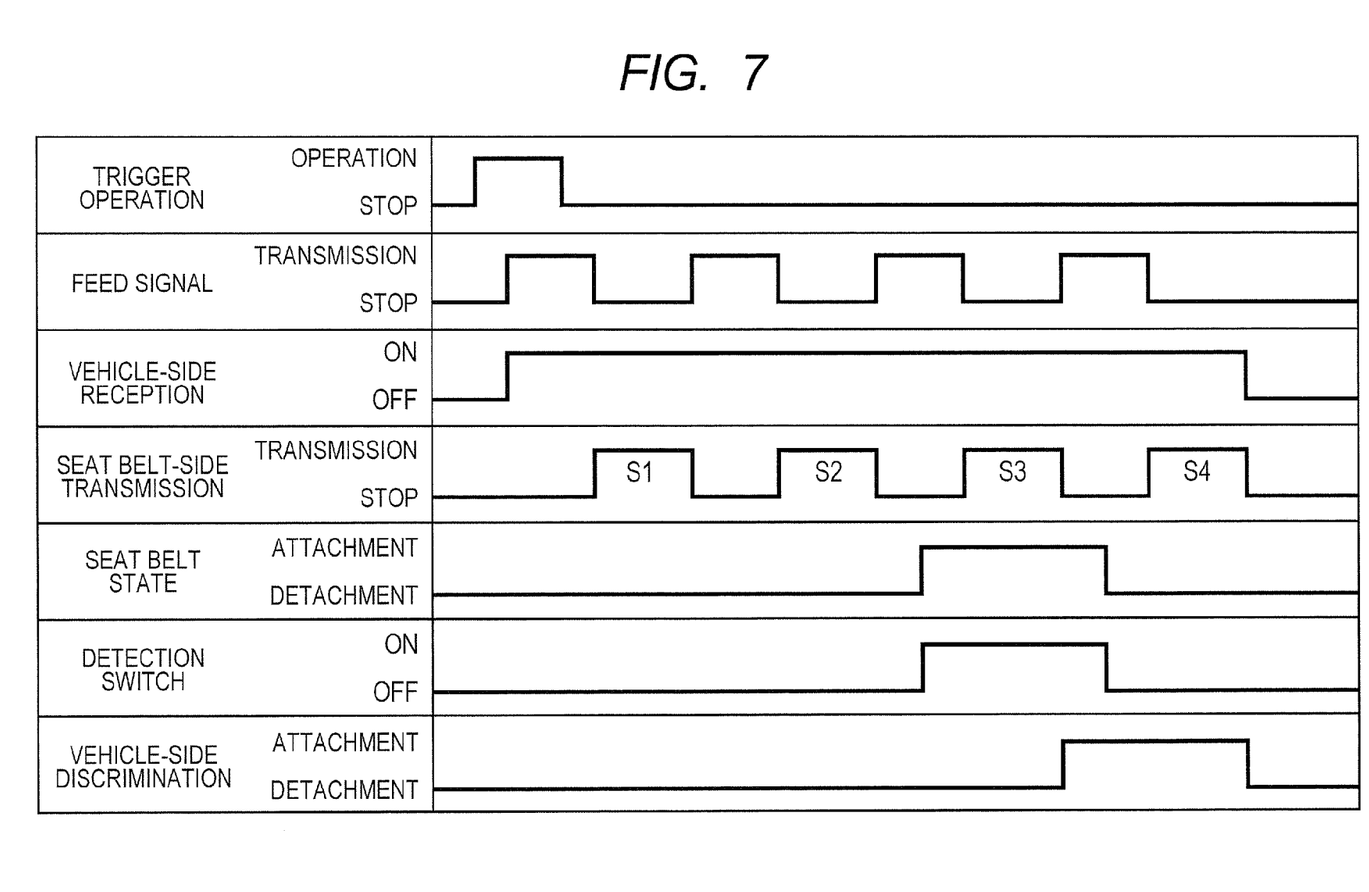
FIG. 7 is a chart diagram of a signal in communication between a vehicle side device and a seat belt side device according to embodiments of the disclosure.

The operation of the vehicle side device 30 and the seat belt side device 40 is described in further detail. FIG. 7 is a chart diagram of the signal in communication between the vehicle side device 30 and seat belt side device 40. When the trigger operation is detected in the trigger-operation detection section 33, the vehicle side transmitting-receiving section 31 is from the sleep state to the actuation state by the command signal output from the control section 34 and the power feeding signal may be transmitted intermittently several times from the vehicle side device 30. In addition, the vehicle side transmitting-receiving section 31 may be ready to receive the signal which is output from the seat belt side device 40 when the power feeding signal is transmitted intermittently.

The seat belt side device 40 may transmit intermittently the detaching-installing signal to the vehicle side device 30 in response to the power feeding signal from the vehicle side device 30. In FIG. 7, reference numerals S1 to S4 are referred to the signals transmitted from the seat belt side device 40 and the seat belt may be in the installation state from the non-installation state after the signal S2 among them is transmitted, and the seat belt 3 may be in the non-installation state from the installation state after the signal S3 is transmitted.

When the seat belt 3 is in the installation state from the non-installation state, the detection switch 27 may be turned on from off and, as described above, the signal S3 output from the seat belt side device 40 may be the signal having a frequency different from when the seat belt 3 is in the non-installation state. In other words, the signal S3 in FIG. 7 may be different from the signal S1 or S2 corresponding to FIG. 6A and is the signal having the frequency corresponding to FIG. 6B. Accordingly, the determination section 32a of the vehicle side device 30 may recognize that the seat belt 3 is in the installation state.

Meanwhile, when the seat belt 3 is in the non-installation state from the installation state, the detection switch 27 may be turned off from on and the signal S4 output from the seat belt side device 40 is a signal having a frequency different from when the seat belt 3 is in the installation state. In other words, the signal S4 in FIG. 7 may be a signal having the frequency different from S3 and the same as S1 or S2. Accordingly, the determination section 32a of the vehicle side device 30 may recognize that the seat belt 3 is in the non-installation state.

Figure 8:
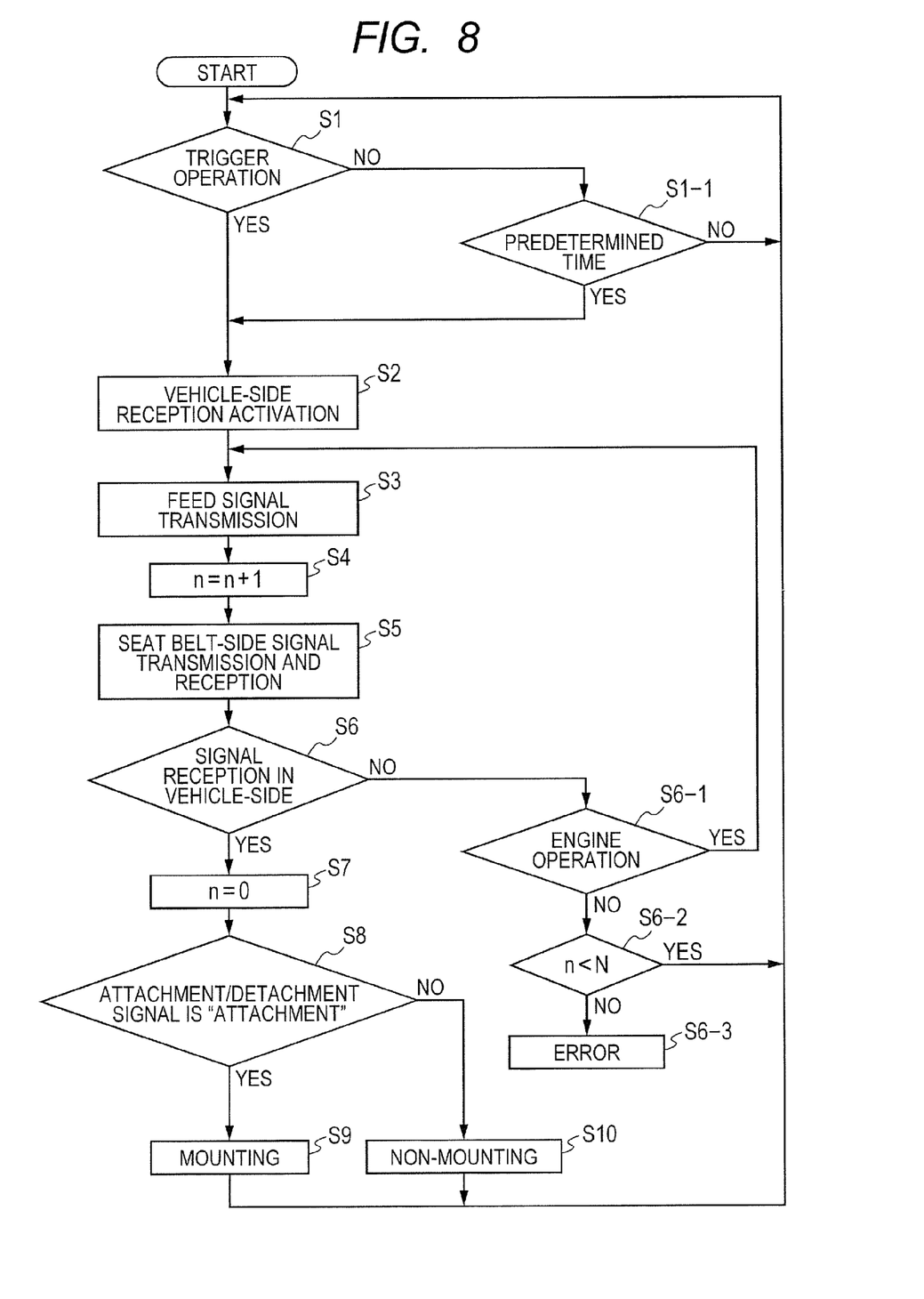
FIG. 8 is a flowchart determining an installation state of a seat belt according to embodiments of the disclosure.

FIG. 8 is a flowchart determining the installation state of the seat belt 3. When the flow is started, the control section 32 of the vehicle side device 30 may detect present or absent of the trigger operation (S1). The trigger operation may be detected by the trigger-operation detection section 33 as described above. When the trigger operation is detected at S1, the vehicle side transmitting-receiving section 31 may be ready to receive the signal (S2). When the trigger operation is not detected at S1, the operation of S1 may be repeated until a predetermined time is lapsed (S1-1). When a printed time is lapsed, S2 may be performed similar to the case where the trigger operation is present.

When the vehicle side transmitting-receiving section 31 is ready to receive the signal, the power feeding signal modulated from the vehicle side transmitting-receiving section 31 may be transmitted (S3). Here as illustrated in FIG. 7, the power feeding signal may be transmitted intermittently several times. Sequentially, in the determination section 32a, 1 may be added to a variable n (S4). This is intended to count the number of times of the power feeding signal being transmitted.

In the seat belt side device 40, as described above, when the power feeding signal is received, the signal may be demodulated by the power supply of the power feeding signal, the detaching-installing signal may be output from the output unit 42 according to the connection state between the detection switch 27 and the signal changing unit 42b, and the detaching-installing signal may be transmitted from the seat belt side transmitting-receiving section 41 (S5).

When the vehicle side transmitting-receiving section 31 receives the signal from the seat belt side device 40 (S6), the determination section 32a may make the variable n to 0 (S7). Meanwhile, when the vehicle side transmitting-receiving section 31 cannot receive the signal from the seat belt side device 40, the control section 32 (the determination section 32a) further detects the operation state of the engine (S6-1) and S3 to S6 are repeated when the engine is operated. When the engine is not operated at S6-1, whether or not the variable n is smaller than a predetermined value N is determined, in other words, whether or not the number of the transmissions of the power feeding signal reaches a predetermined number is determined (S6-2). When the number of the transmissions of the power feeding signal is smaller than a predetermined number, the operation may be repeated from S1. When the number of the transmissions of the power feeding signal is the predetermined number or more, error may occur (S6-3). The state of the generation of the error may be displayed on the instrument panel of the driver's seat through the system inside the vehicle.

When S7 is performed, next, the control section 32 may determine the detaching-installing state of the seat belt 3, based on the detaching-installing signal received from the seat belt side device 40 (S8). In the embodiment, as described above, the detaching-installing state of the seat belt 3 may be determined by the frequency of the detaching-installing signal which may be received by the seat belt side device 40. Here, when the detaching-installing state is a signal indicating "installing", the determination section 32a may determine that the seat belt 3 is in the installation state (S9), otherwise, the determination section 32a may determine that the seat belt 3 is in the non-installation state (S10). The determined states may be displayed on an instrument panel or the like of a driver's seat through a system inside the vehicle. When the determination is performed, the operation may be repeated from the beginning.

As described above, in the vehicle 1 including the seat belt 3, the power, required for operation in the seat belt side device 40 may be supplied by the power feeding signal from the vehicle side device 30 to the seat belt side device 40 in order to determine the installation state of the seat belt 3 provided on the detachable seat 2. Accordingly, it may not be necessary to provide the battery on the seat 2 side and to exchange the battery. In addition, it may be possible to determine the detaching-installing state of the seat belt 3 at any time and in a short time. In addition, the signal transmitted from the seat belt side device 40 may be changed only by providing the signal changing unit 42b consisting of the detection switch 27 and the capacitor which may be switched by the installation state of the seat belt 3 and the capacitor so that the installation state of the seat belt 3 can be determined the installation state of the seat belt 3 with a simple structure.

The capacitor may be used as the signal changing unit 42b in FIG. 5; however, a resistance instead of the capacitor may be used as the signal changing unit 42b. When the resistance is the signal changing unit 42b, the vibrator 42a may be in the connection state by the detection switch 27 and then the impedance may be changed in the oscillation circuit so that the frequency of the output signal is not changed and the attenuation rate is changed.

Figure 9A:
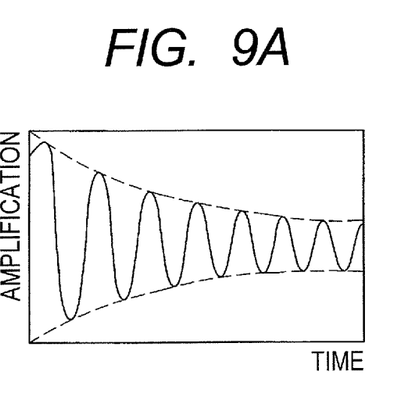
FIGS. 9A and 9B are waveform diagrams of a signal output from an output unit in a case where a signal change unit is resistance according to embodiments of the disclosure.
Figure 9B:
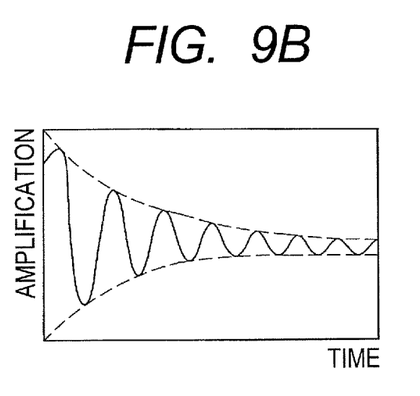

FIGS. 9A and 9B are waveform diagrams of a signal output from the output unit 42 in a case where the signal change unit 42b is the resistance. FIG. 9A illustrates a state where the first detection switch 27 is turned off and the vibrator 42a is not connected to the signal changing unit 42b, in other words, illustrates the signal of the non-installation state of the seat belt 3, and is the same as FIG. 6A. FIG. 9B illustrates a state where the first detection switch 27 is turned on and the vibrator 42a is connected to the signal changing unit 42b consisting of the resistance, in other words, illustrates the signal of the installation state of the seat belt 3. As illustrated in the views, in the output signal from the output unit 42, the attenuation rate of the signal may be large with the progress of time compared to the case of FIG. 9A. The determination section 32a of the vehicle side device 30 can determine the installation state of the seat belt 3 by detecting the attenuation rate of the signal from the seat belt side device 40.

Figure 10:
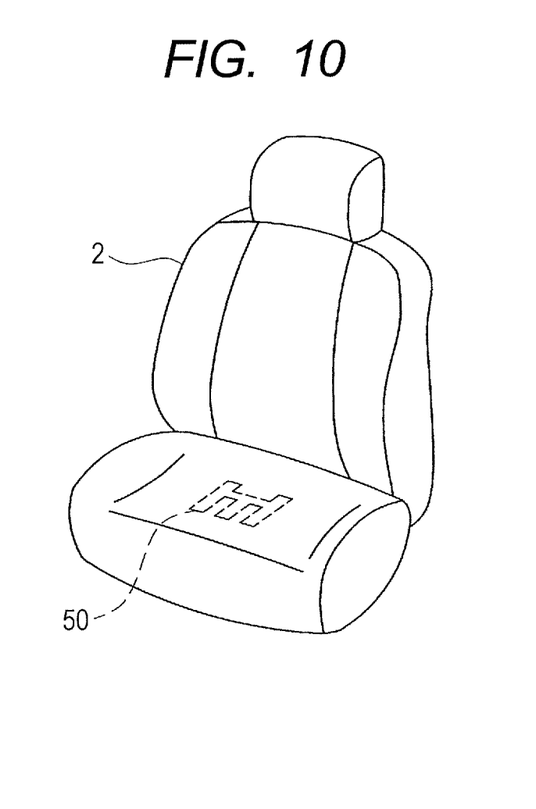
FIG. 10 is a perspective view of a detachable seat according to embodiments of the disclosure.

In addition, it may be possible to determine whether or not a person is seated as well as the installation state of the seat belt 3 in the seat 2. FIG. 10 is a perspective view of the detachable seat 2. As illustrated in the view, a seat sensor 50 may be provided inside the seat surface of the seat 2 as a second switching unit which detecting presence or absence of seating, in other words, the presence or absence of the load applied on the seat 2. The seat sensor 50 may be configured such that an electrode seat may be laminated on an upper surface or a lower surface of a pressure sensitive rubber seat.

Figure 11:
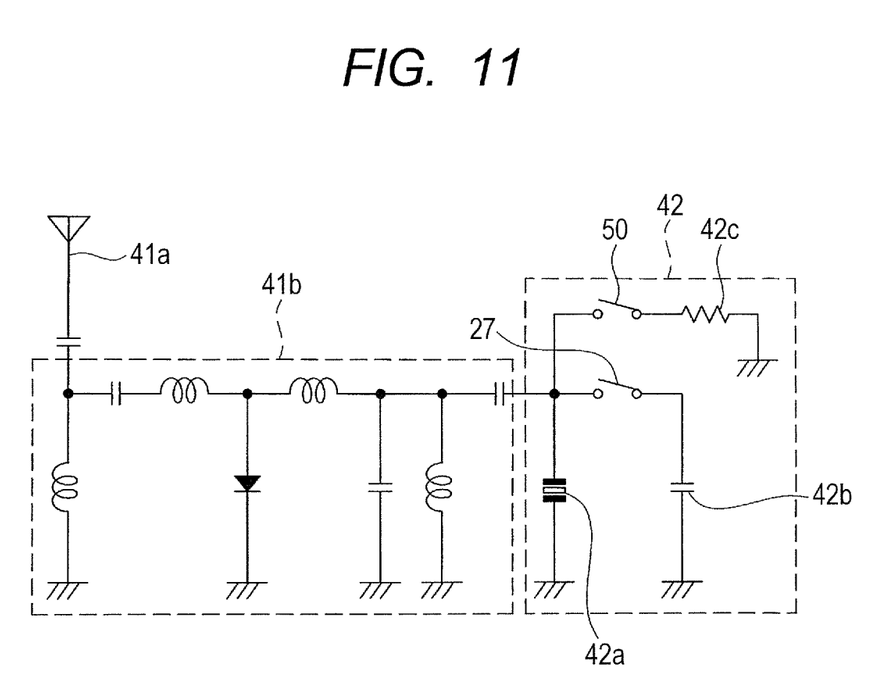
FIG. 11 is a circuit diagram illustrating a configuration of a seat belt side device in a case where both of an installation state of the seat belt and a seated state of the seat are detected according to embodiments of the disclosure.

FIG. 11 is a circuit diagram illustrating a configuration of the seat belt side device 40 in a case where both of the detaching-installing state of the seat belt 3 and a seated state of the seat 2 are detected. In addition, in FIG. 11, for the sake of convenience, the seat sensor 50 is illustrated as a single switch.

As illustrated in FIG. 11, the seat sensor 50 as the second switching unit may be connected in parallel with the detection switch 27 which may be the first switch unit and a second signal changing unit 42c consisting of the resistance is connected in series with the seat sensor 50. As described above, the output unit 42 may be configured such that the grounded vibrator 42a, the grounded first signal changing unit 42b and the grounded second signal changing unit 42c may be connected in parallel with each other.

In a case of FIG. 11, the connection state between the vibrator 42a and the signal changing unit 42b may be changed by the detection switch 27 being turned on and off, and the frequency of the output signal may be changed. Meanwhile, the connection state between the vibrator 42a and the second signal changing unit 42c may be changed by the change in the output of the seat sensor 50, and the attenuation rate of the output signal may be changed. In addition, when a person is seated on the seat 2 and the seat belt 3 is installed, the vibrator 42a may be connected to both of the signal changing unit 42b and the second signal changing unit 42c and the output signal may be a signal which may be different in both the frequency and the attenuation rate. Accordingly, the vehicle side device 30 can determine both of the installation state of the seat belt 3 and the seated state of the seat 2 by detecting the frequency and the attenuation rate of the signal from the seat belt side device 40.

The combining of the capacitor and the resistance to the signal changing unit 42b and the second signal changing unit 42c may be selected arbitrarily. In other words, the signal changing unit 42b may be the resistance and the second signal changing unit 42c may be the capacitor, and both of them may be the resistance or both of them may be the capacitor. When both of them are the resistance, signals of four patterns having different attenuation rates can be generated by using the resistances having resistance values different from each other in the combination. Similarly, when both of them are the capacitor, signals of four patterns having different frequencies can be generated by using the capacitances having capacitance values different from each other.

Figure 12:
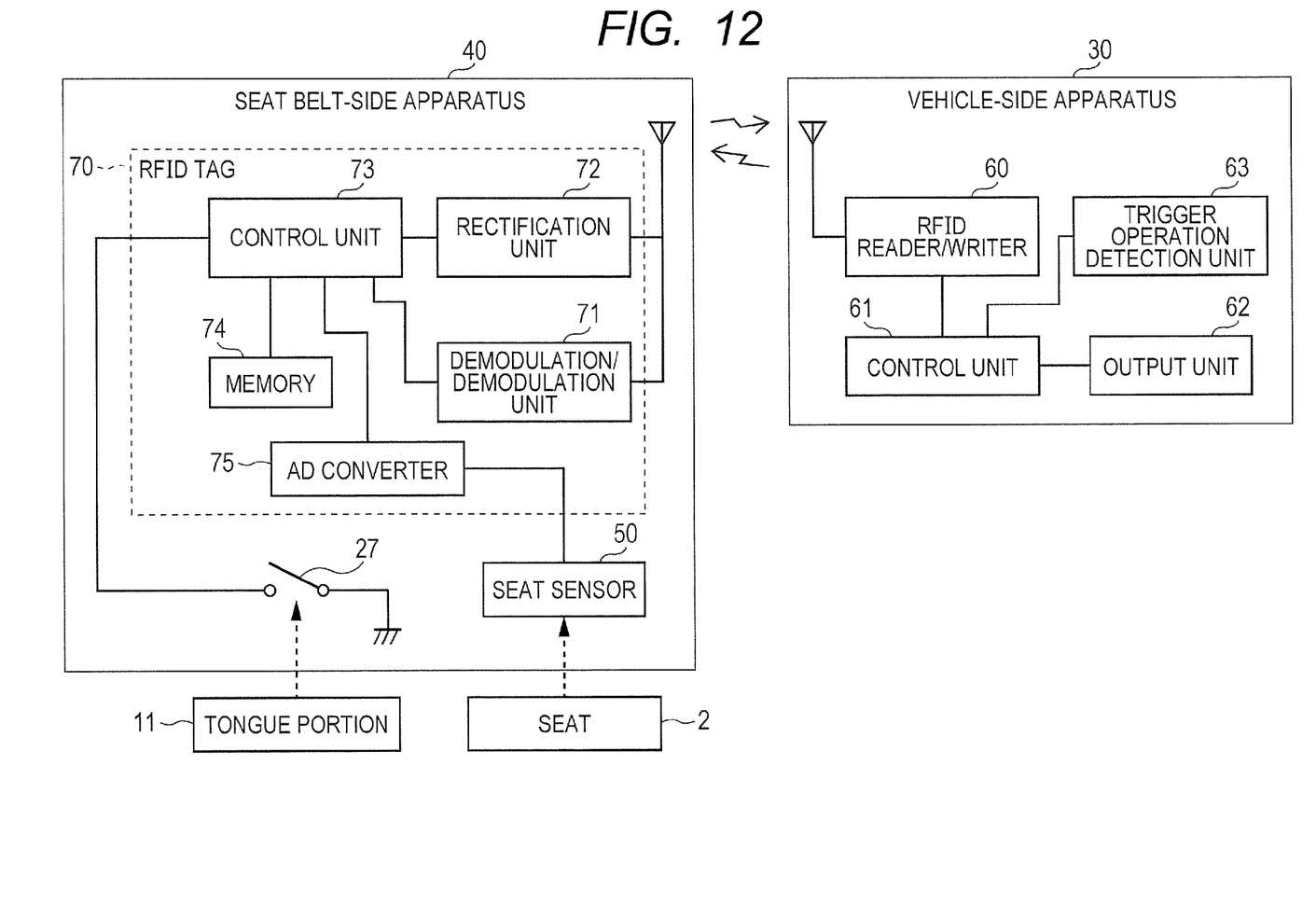
FIG. 12 is a block diagram of a vehicle side device and a seat belt side device using a RFID according to embodiments of the disclosure.

In order to determine the detaching-installing state of the seat belt 3, the RFID can be used. FIG. 12 is a block diagram of the vehicle side device 30 and the seat belt side device 40 using the RFID. As illustrated in the view, the vehicle side device 30 may have a RFID reader•writer 60 as the vehicle side transmitting-receiving section. The RFID reader•writer 60 may make the transmitting and receiving of the signal to be controlled by a control section 61. A trigger-operation detection section 63 and an output section 62 may be connected to the control section 61.

The seat belt side device 40 may have a RFID tag 70 as the seat belt side transmitting-receiving section. The RFID tag 70 may include a modem section 71, a rectification section 72, a control section 73, a memory 74 and an AD converter 75. The detection switch 27 as the switching unit may be connected to the control section 73. In addition, the seat sensor 50 of the seat 2 may be connected to the AD converter 75. In addition, if the detection switch 27 is a switch which simply switches ON and OFF, the AD converter 75 may not be necessary.

Also in FIG. 12, the power may be supplied to the seat belt side device 40 by the power feeding signal from the RFID reader•writer 60 that is the vehicle side transmitting-receiving section. In addition, the control section 73 may detect the detaching-installing state of the seat belt 3 by the state of the detection switch 27 and may detect the seated state of the seat 2 via the AD converter 75 by the state of the seat sensor 50, and may transmit the information including the transmitting signal to the vehicle side device 30. The vehicle side device 30, which may receive the signal from the seat belt side device 40, and may output the installation state of the seat belt 3 and the seated state of the seat 2 from the output section 62. In addition, the output information may be displayed on the displayed on the instrument panel or the like of a driver's seat through the system inside the vehicle.

As described above, since it is not necessary to provide the battery on the seat 2 side (seat belt side device 40) even though the RFID reader•writer 60 and the RFID tag 70 are used, it may not be necessary to exchange the battery and it may be possible to determine the detaching-installing states of the seat belt 3 and the seat 2 at any time. In addition, the configuration of the apparatus can be simplified with low cost.

As described above, as the seat belt according to the embodiment of the invention, an example is described, which is installed on the detachable seats 2 of the last row in three rows provided in the room of the vehicle; however, of course, the invention may be applied to the front row seat (the driver's seat and the passenger's seat) which is not detachable or applied to the seat row which is positioned back of the front seat. In addition, when the battery is mounted on the seat belt side device 40, the power feeding signal described above is not necessary. As described above, the application of the invention is not limited to the embodiments and may be applied in various ways within the scope of the technical idea of the invention.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A vehicle including a seat belt comprising:
a seat belt which is provided on a seat and has a vehicle side device wireless communicating with the seat belt side and determining an installation state of the seat belt,
wherein the seat belt includes a seat belt side transmitting-receiving section which transmits a detaching-installing signal indicating whether or not the seat belt is in the installation state to the vehicle side device when receiving a request signal transmitted from the vehicle side device, and an output unit which outputs the detaching-installing signal to the seat belt side transmitting-receiving section, and
wherein the vehicle side device includes vehicle side transmitting-receiving section which transmits the request signal to the seat belt side transmitting-receiving section and receives the detaching-installing signal, and a control section which controls the vehicle side transmitting-receiving section so as to output the request signal and determines the installation state of the seat belt, based on the detaching-installing signal,
wherein the seat belt side transmitting-receiving section has a RF circuit section, the output unit has a resonant circuit section connected to the RF circuit section and the resonant circuit section in which a grounded vibrator and a grounded signal changing unit are connected in parallel with each other and which has a switching unit switching the connection state between the vibrator and the signal changing unit.

2. The vehicle including the seat belt according to claim 1, wherein the signal changing unit is configured of a first signal changing unit and a second signal changing unit which are connected in parallel with each other,
wherein the switching unit is configured of a first switching unit which is connected in series with the first signal changing unit and a second switching unit which is connected in series with the second signal changing unit, and
wherein the first signal changing unit is provided on the seat belt and the second signal changing unit is provided on the seat.

3. The vehicle including the seat belt according to claim 2, wherein the first signal changing unit is configured of any one of a capacitor and a resistance, and the second signal changing unit is configured of the other of the capacitor and the resistance.

4. The vehicle including the seat belt according to claim 2, wherein the vehicle side device includes a trigger-operation detection section which detects a trigger operation corresponding to a timing when the installation state of the seat belt is determined, and
wherein the trigger-operation detection section is connected to the control section and the control section instructs the vehicle side transmitting-receiving section to output the request signal when the signal is input from the trigger-operation detection section.

5. The vehicle including the seat belt according to claim 3,
wherein the vehicle side device includes a trigger-operation detection section which detects a trigger operation corresponding to a timing when the installation state of the seat belt is determined, and
wherein the trigger-operation detection section is connected to the control section and the control section instructs the vehicle side transmitting-receiving section to output the request signal when the signal is input from the trigger-operation detection section.

6. The vehicle including the seat belt according to claim 1,
wherein the vehicle side transmitting-receiving section is configured of a RFID reader writer, and
wherein the seat belt side transmitting-receiving section and the output unit are configured of a RFID tag, and the switching unit is connected to the RFID tag.

7. The vehicle including the seat belt according to claim 1,
wherein the switching unit is configured of a detection switch provided inside a buckle section consisting the seat belt.

8. A seat belt system for use within a vehicle, the seat belt system comprising:
a seat belt which is provided on a seat and has a vehicle side device wireless communicating with the seat belt side and determining an installation state of the seat belt,
wherein the seat belt includes a seat belt side transmitting-receiving section which transmits a detaching-installing signal indicating whether or not the seat belt is in the installation state to
the vehicle side device when receiving a request signal transmitted from the vehicle side device, and an output unit which outputs the detaching-installing signal to the seat belt side transmitting-receiving section, and
wherein the vehicle side device includes vehicle side transmitting-receiving section which transmits the request signal to the seat belt side transmitting-receiving section and receives the detaching-installing signal, and a control section which controls the vehicle side transmitting-receiving section so as to output the request signal and determines the installation state of the seat belt, based on the detaching-installing signal,
the seat belt side transmitting-receiving section has a RF circuit section, the output unit has a resonant circuit section connected to the RF circuit section and the resonant circuit section in which a grounded vibrator and a grounded signal changing unit are connected in parallel with each other and which has a switching unit switching the connection state between the vibrator and the signal changing unit.

9. The seat belt system according to claim 8,
wherein the signal changing unit is configured of a first signal changing unit and a second signal changing unit which are connected in parallel with each other,
wherein the switching unit is configured of a first switching unit which is connected in series with the first signal changing unit and a second switching unit which is connected in series with the second signal changing unit, and
wherein the first signal changing unit is provided on the seat belt and the second signal changing unit is provided on the seat.

10. The seat belt system according to claim 9,
wherein the first signal changing unit is configured of any one of a capacitor and a resistance, and the second signal changing unit is configured of the other of the capacitor and the resistance.

11. The seat belt system according to claim 9,
wherein the vehicle side device includes a trigger-operation detection section which detects a trigger operation corresponding to a timing when the installation state of the seat belt is determined, and
wherein the trigger-operation detection section is connected to the control section and the control section instructs the vehicle side transmitting-receiving section to output the request signal when the signal is input from the trigger-operation detection section.

12. The seat belt system according to claim 10,
wherein the vehicle side device includes a trigger-operation detection section which detects a trigger operation corresponding to a timing when the installation state of the seat belt is determined, and
wherein the trigger-operation detection section is connected to the control section and the control section instructs the vehicle side transmitting-receiving section to output the request signal when the signal is input from the trigger-operation detection section.

13. The seat belt system according to claim 8,
wherein the vehicle side transmitting-receiving section is configured of a RFID reader•writer, and
wherein the seat belt side transmitting-receiving section and the output unit are configured of a RFID tag, and the switching unit is connected to the RFID tag.

14. The seat belt system according to claim 8,
wherein the switching unit is configured of a detection switch provided inside a buckle section consisting the seat belt.

* * * * *